US012776582B2

(12) United States Patent
Kim et al.

(10) Patent No.: US 12,776,582 B2
(45) **Date of Patent: *Oct. 27, 2026**

(54) ANTENNA MODULE INCLUDING DIELECTRIC MATERIAL AND ELECTRONIC DEVICE INCLUDING ANTENNA MODULE

(71) Applicant: Samsung Electronics Co., Ltd., Suwon-si (KR)

(72) Inventors: Yoongeon Kim, Suwon-si (KR); Seungtae Ko, Suwon-si (KR); Hyunjin Kim, Suwon-si (KR); Jungmin Park, Suwon-si (KR); Junsig Kum, Suwon-si (KR); Youngju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/785,750

(22) Filed: Jul. 26, 2024

(65) Prior Publication Data

US 2024/0387999 A1 Nov. 21, 2024

Related U.S. Application Data

(63) Continuation of application No. 18/323,809, filed on May 25, 2023, now Pat. No. 12,051,860, which is a (Continued)

(30) Foreign Application Priority Data

Apr. 18, 2018 (KR) ........................ 10-2018-0045267

(51) Int. Cl.

| | |
|---|---|
| ***H01Q 9/04*** | (2006.01) |
| ***H01Q 1/24*** | (2006.01) |
| ***H01Q 21/00*** | (2006.01) |

(52) U.S. Cl.

CPC .......... *H01Q 9/0485* (2013.01); *H01Q 1/241* (2013.01); *H01Q 21/0006* (2013.01)

(58) Field of Classification Search

CPC .. H01Q 9/0485; H01Q 1/241; H01Q 21/0006; H01Q 1/1207; H01Q 1/1221; (Continued)

(56) References Cited

U.S. PATENT DOCUMENTS

| | | | |
|---|---|---|---|
| 8,462,063 | B2 | 6/2013 | Gummalla et al. |
| 8,994,601 | B2 | 3/2015 | Hefele et al. |

(Continued)

FOREIGN PATENT DOCUMENTS

| | | | |
|---|---|---|---|
| CN | 1720637 | A | 1/2006 |
| CN | 102077413 | A | 5/2011 |

(Continued)

OTHER PUBLICATIONS

European Office Action dated Aug. 27, 2024, issued in European Application No. 19788863.9.

(Continued)

*Primary Examiner* — David E Lotter

(74) *Attorney, Agent, or Firm* — Jefferson IP Law, LLP

(57) ABSTRACT

An antenna module of a wireless communication system is provided. The antenna module includes a radiator comprising a top face to which a radio wave is radiated, a dielectric material disposed on a bottom face of the radiator, the bottom face of the radiator being opposite to the top face of the radiator, a feeding unit disposed on a bottom face of the dielectric material, the feeding unit being configured to supply an electric signal to the radiator through the dielectric material, and a support unit disposed on the bottom face of the dielectric material, the support unit comprising a metallic material.

20 Claims, 7 Drawing Sheets

Related U.S. Application Data continuation of application No. 17/316,078, filed on May 10, 2021, now Pat. No. 11,695,211, which is a continuation of application No. 17/063,107, filed on Oct. 5, 2020, now Pat. No. 11,223,135, which is a continuation of application No. 16/369,325, filed on Mar. 29, 2019, now Pat. No. 10,797,397.

(58) Field of Classification Search

CPC ...... H01Q 25/001; H01Q 9/0407; H01Q 1/50; H01Q 1/12; H01Q 1/38; H01Q 1/46; H04B 7/0413

See application file for complete search history.

(56) References Cited

U.S. PATENT DOCUMENTS

| | | | | |
|---|---|---|---|---|
| 9,660,338 | B2 | 5/2017 | Wild et al. | |
| 9,912,034 | B2 | 3/2018 | Sanford et al. | |
| 9,941,570 | B2 | 4/2018 | Sanford et al. | |
| 10,535,926 | B2 | 1/2020 | Lee | |
| 10,797,397 | B2 * | 10/2020 | Kim | H01Q 9/0485 |
| 11,063,364 | B2 * | 7/2021 | Kim | H01Q 1/1221 |
| 11,108,160 | B2 * | 8/2021 | Kim | H01Q 21/0006 |
| 11,223,134 | B2 * | 1/2022 | Kim | H01Q 9/0407 |
| 11,223,135 | B2 * | 1/2022 | Kim | H01Q 1/1207 |
| 11,362,437 | B2 | 6/2022 | Piegsa et al. | |
| 11,695,211 | B2 * | 7/2023 | Kim | H01Q 9/0485 343/911 R |
| 12,051,860 | B2 * | 7/2024 | Kim | H01Q 1/241 |
| 2004/0104847 | A1 | 6/2004 | Killen et al. | |
| 2004/0217910 | A1 | 11/2004 | Montgomery et al. | |
| 2006/0220976 | A1 | 10/2006 | Schadler et al. | |
| 2007/0132642 | A1 | 6/2007 | Iluz et al. | |
| 2008/0030422 | A1 * | 2/2008 | Gevargiz | H01Q 3/26 343/860 |
| 2013/0050028 | A1 * | 2/2013 | Nogami | H01Q 1/38 343/700 MS |
| 2014/0225782 | A1 | 8/2014 | Sanford | |
| 2015/0188230 | A1 | 7/2015 | Kim et al. | |
| 2015/0280328 | A1 | 10/2015 | Sanford et al. | |
| 2017/0194703 | A1 | 7/2017 | Watson | |
| 2017/0250471 | A1 | 8/2017 | Lee | |
| 2017/0271772 | A1 | 9/2017 | Miraftab et al. | |
| 2018/0034165 | A1 | 2/2018 | Aleksandrovich et al. | |
| 2024/0266709 | A1 | 8/2024 | Sanford et al. | |

FOREIGN PATENT DOCUMENTS

| | | | |
|---|---|---|---|
| CN | 102790261 | A | 11/2012 |
| CN | 102804501 | A | 11/2012 |
| CN | 202678527 | U | 1/2013 |
| CN | 104981941 | A | 10/2015 |
| CN | 105206946 | A | 12/2015 |
| CN | 106299724 | A | 1/2017 |
| CN | 107134633 | A | 9/2017 |
| CN | 107528115 | A | 12/2017 |
| CN | 107919522 | A | 4/2018 |
| EP | 2 712 028 | B1 | 5/2018 |
| KR | 10-2012-0015554 | A | 2/2012 |
| KR | 10-2012-0081421 | A | 7/2012 |
| TW | 200843201 | A | 11/2008 |
| TW | 201106640 | A | 2/2011 |
| TW | 201448352 | A | 12/2014 |
| WO | 2004/051792 | A2 | 6/2004 |

OTHER PUBLICATIONS

International Search Search Report dated Jul. 8, 2019, issued in International Search Patent Application No. PCT/KR2019/003705.
European Search Report dated May 3, 2021, issued in European Application No. 19788863.9.
Korean Notice of Allowance dated Aug. 12, 2022, issued in Korean Patent Application No. 10-2018-0045267.
Chinese Notification of Reexamination dated Nov. 30, 2022, issued in Chinese Patent Application No. 201980027196.4.
Chinese Office Action dated Mar. 6, 2023, issued in Chinese Patent Application No. 202110302531.6.
Chinese Office Action dated Apr. 27, 2023, issued in a counterpart Chinese Application No. 201980027196.4.
Canadian Office Action dated Jun. 22, 2023, issued in a Canadian Patent Application No. 3,097,520.
Chinese Office Action dated Jan. 30, 2024, issued in Chinese Application No. 202110302531.6.
Chinese Office Action dated Apr. 12, 2024, issued in Chinese Application No. 202110302531.6.
Chinese Office Action dated Jul. 16, 2026, issued in Chinese Application No. 202110302531.6.
European Office Action dated Mar. 20, 2026, issued in European Application No. 19 788 863.9.
Chinese Office Action dated Apr. 17, 2026, issued in Chinese Application No. 2023109203195.
A Chinese Decision of Reexamination dated Aug. 28, 2026, issued in a Chinese Application No. 202110302531.6.

* cited by examiner

ANTENNA MODULE INCLUDING DIELECTRIC MATERIAL AND ELECTRONIC DEVICE INCLUDING ANTENNA MODULE

CROSS-REFERENCE TO RELATED APPLICATION(S)

This application is a continuation application of prior application Ser. No. 18/323,809, filed on May 25, 2023, which has issued as U.S. Pat. No. 12,051,860 on Jul. 30, 2024, which is a continuation application of prior application Ser. No. 17/316,078, filed on May 10, 2021, which has issued as U.S. Pat. No. 11,695,211 on Jul. 4, 2023, which is a continuation application of prior application Ser. No. 17/063,107, filed on Oct. 5, 2020, which has issued as U.S. Pat. No. 11,223,135 on Jan. 11, 2022, which is a continuation of prior application Ser. No. 16/369,325, filed on Mar. 29, 2019, which has issued as U.S. Pat. No. 10,797,397 on Oct. 6, 2020 and is based on and claims priority under 35 U.S.C. 119 (a) of a Korean patent application number 10-2018-0045267, filed on Apr. 18, 2018, in the Korean Intellectual Property Office, the disclosure of which is incorporated by reference herein in its entirety.

BACKGROUND

1. Field

The disclosure provides an antenna module capable of improving communication efficiency in a next-generation communication system and an electronic device including the antenna module.

2. Description of the Related Art

The above information is presented as background information only to assist with an understanding of the disclosure. No determination has been made, and no assertion is made, as to whether any of the above might be applicable as prior art with regard to the disclosure.

To meet the demand for wireless data traffic having increased since the deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'. The 5G communication system is considered to be implemented in higher frequency (mm Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like. In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology," "wired/wireless communication and network infrastructure", "service interface technology," and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

As described above, in the frequency band to which a next-generation mobile communication system is applied, the performance of the antenna module may be deteriorated due to the path loss of radio waves or the like. Therefore, in the next-generation mobile communication system, an antenna module structure for solving such a problem is required.

Aspects of the disclosure are to address at least the above-mentioned problems and/or disadvantages and to provide at least the advantages described below. Accordingly, an aspect of the disclosure is to provide an antenna module structure capable of implementing smooth communication even in a massive multiple-input multiple-output (MIMO) communication environment.

Additional aspects will be set forth in part in the description which follows and, in part, will be apparent from the description, or may be learned by practice of the presented embodiments.

In accordance with an aspect of the disclosure, an antenna module is provided. The antenna module includes a radiator having a top face to which a radio wave is radiated, a dielectric material disposed on a bottom face of the radiator, the bottom face of the radiator being opposite to the top face of the radiator, a feeding unit disposed on a bottom face of the dielectric material, the feeding unit being configured to supply an electric signal to the radiator through the dielectric material, and a support unit disposed on the bottom face of the dielectric material, the support unit comprising a metallic material.

The antenna module may further include a printed circuit board (PCB) coupled to the feeding unit and the support unit to supply the electric signal to the feeding unit.

The feeding unit and the support unit may be disposed such that the bottom face of the dielectric material and a top face of the PCB are spaced apart from each other by a predetermined first length, and a frequency characteristic of the radio wave radiated through the radiator may be determined based on the predetermined first length.

Each of the feeding unit and the support unit may include a first segment disposed on the bottom face of the dielectric material, and a second segment extending from a first end of the first segment toward the PCB to be coupled to a top face of the PCB.

Each of the feeding unit and the support unit may further include a third segment extending from the second end of the first segment toward the PCB to be coupled to the top face of the PCB.

The dielectric material may be disposed to enclose the feeding unit and the support unit, and each of the first segment, the second segment, and the third segment may further include a protrusion so as not to be separated from the dielectric material.

The feeding unit may include a first feeding unit configured to supply an electric signal related to horizontal polarization to the radiator, and a second feeding unit configured to supply an electric signal related to vertical polarization to the radiator. On the bottom face of the dielectric material, an extension line of the first feeding unit and an extension line of the second feeding unit may be perpendicular to each other.

The support unit may include a first support unit disposed on the extension line of the first feeding unit on the bottom face of the dielectric material, and a second support unit disposed on the extension line of the second feeding unit on the bottom face of the dielectric material.

In accordance with another aspect of the disclosure, an antenna module is provided. The antenna module includes an insulator having a plate shape and comprising a conductive pattern formed thereon for an electric signal to flow therethrough, a metal structure disposed on a top face of the insulator, the metal structure being configured to radiate a radio wave through a top face of the metal structure, the top face of the metal structure being spaced apart from the insulator by a predetermined first length, and a wireless communication chip disposed on a bottom face of the insulator, the wireless communication chip being configured to supply the electric signal to the metal structure through the conductive pattern to radiate the radio wave.

The metal structure may include a first feeding unit having a first end electrically connected to a conductive pattern formed on the insulator and a second end electrically connected to the top face of the metal structure, the first feeding unit being disposed such that the top face of the metal structure is spaced apart from the top face of the insulator by the predetermined first length, a second feeding unit having a first end electrically connected to a conductive pattern formed on the insulator and a second end electrically connected to the top face of the metal structure, the second feeding unit being disposed such that the top face of the metal structure is spaced apart from the top face of the insulator by the predetermined first length and a support unit having a first end connected to the top face of the insulator and a second end connected to the top face of the metal structure, the support unit being disposed such that the top face of the metal structure is spaced apart from the top face of the insulator by the predetermined first length.

On the top face of the insulator, an extension line of the first feeding unit and an extension line of the second feeding unit may be perpendicular to each other, and the support unit may be disposed in a region between the extension line of the first feeding unit and the extension line of the second feeding unit.

In accordance with another aspect of the disclosure, an electronic device is provided. The electronic device includes an antenna module. The antenna module includes a radiator having a top face, a radio wave being radiated toward the top face of the radiator, a dielectric material disposed on a bottom face of the radiator, the bottom face of the radiator being opposite to the top face of the radiator, a feeding unit disposed on a bottom face of the dielectric material, the feeding unit being configured to supply an electric signal to the radiator through the dielectric material, and a support unit disposed on the bottom face of the dielectric material, the support unit comprising a metallic material.

The electronic device may further include a printed circuit board (PCB) coupled to the feeding unit and the support unit to supply the electric signal to the feeding unit.

The feeding unit and the support unit may be disposed such that the bottom face of the dielectric material and a top face of the PCB are spaced apart from each other by a predetermined first length, and a frequency characteristic of the radio wave radiated through the radiator may be determined on the basis of the predetermined first length.

Each of the feeding unit and the support unit may include a first segment disposed on the bottom face of the dielectric material, and a second segment extending from a first end of the first segment toward the PCB to be coupled to a top face of the PCB.

Each of the feeding unit and the support unit may further include a third segment extending from the second end of the first segment toward the PCB to be coupled to the top face of the PCB.

The dielectric material may be disposed to enclose the feeding unit and the support unit, and each of the first segment, the second segment, and the third segment may further include a protrusion so as not to be separated from the dielectric material.

The feeding unit may include a first feeding unit configured to supply an electric signal related to horizontal polarization to the radiator, and a second feeding unit configured to supply an electric signal related to vertical polarization to the radiator. On the bottom face of the dielectric material, an extension line of the first feeding unit and an extension line of the second feeding unit may be perpendicular to each other.

The support unit may include a first support unit disposed on the extension line of the first feeding unit on the bottom face of the dielectric material, and a second support unit disposed on the extension line of the second feeding unit on the bottom face of the dielectric material.

In accordance with another aspect of the disclosure, an electronic device is provided. The electronic device includes an antenna module. The antenna module includes an insulator having a plate shape and comprising a conductive pattern formed thereon for an electric signal to flow therethrough, a metal structure disposed on a top face of the insulator, the metal structure being configured to radiate a radio wave through a top face of the metal structure, the top face of the metal structure being spaced apart from the insulator by a predetermined first length, and a wireless communication chip disposed on a bottom face of the insulator, the wireless communication chip being configured to supply the electric signal to the metal structure through the conductive pattern to radiate the radio wave.

The metal structure may include a first feeding unit having a first end electrically connected to a conductive pattern formed on the insulator and a second end electrically connected to the top face of the metal structure, the first feeding unit being disposed such that the top face of the metal structure is spaced apart from the top face of the insulator by the first length, a second feeding unit having a first end electrically connected to a conductive pattern formed on the insulator and a second end electrically connected to the top face of the metal structure, the second feeding unit being disposed such that the top face of the metal structure is spaced apart from the top face of the insulator by the first length and a support unit having a first end connected to the top face of the insulator and a second end connected to the top face of the metal structure, the support unit being disposed such that the top face of the metal structure is spaced apart from the top face of the insulator by the first length.

On the top face of the insulator, an extension line of the first feeding unit and an extension line of the second feeding unit are perpendicular to each other, and the support unit may be disposed in a region between the extension line of the first feeding unit and the extension line of the second feeding unit.

According to an embodiment of the disclosure, it is possible to improve antenna performance in a super-high-frequency range used in the next-generation communication system. In addition, it is possible to reduce the defect rate and the manufacturing cost of antenna modules by simplifying the processes required for manufacturing the antenna modules.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
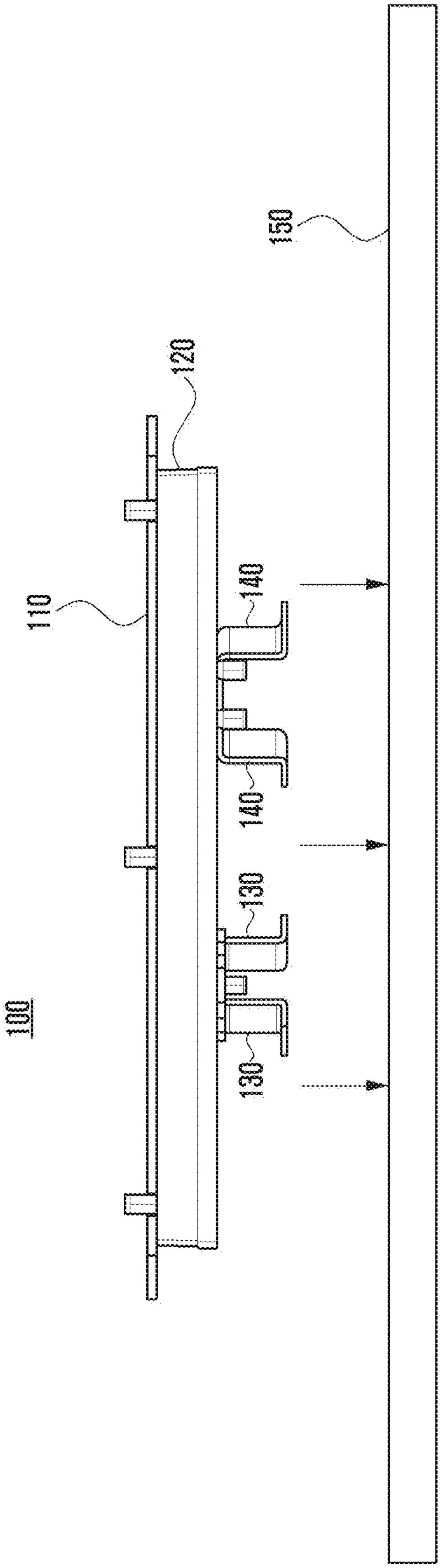
FIG. 1 is a side view of a configuration of an antenna module according to a first embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Additionally, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the “unit” or “module” refers to a software element or a hardware element, such as a field programmable gate array (FPGA) or an application specific integrated circuit (ASIC), which performs a predetermined function. However, the “unit” or “module” does not always have a meaning limited to software or hardware. The “unit” may be configured either to be stored in an addressable storage medium or to execute one or more processors. Therefore, the “unit” includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided in the “units” may be either combined into a smaller number of elements and “units,” or divided into a larger number of elements and “units.” Moreover, the elements and “units” may be implemented to reproduce one or more central processing units (CPUs) within a device or a security multimedia card. Further, in the embodiments, the “unit” may include at least one processor.

The disclosure provides the configuration of an antenna module capable of improving the performance of an antenna module in a next-generation mobile communication system as described above. More specifically, the disclosure provides an antenna module including a dielectric material and a support unit configured to support the dielectric material as a first embodiment, and provides an antenna module using a metal structure as a second embodiment. Hereinafter, the configurations of antenna modules according to the first embodiment and the second embodiment will be described in more detail.

First Embodiment

FIG. 1 is a side view of a configuration of an antenna module according to a first embodiment of the disclosure.

Referring to FIG. 1, the configuration of an antenna module 100 according to the first embodiment may include a radiator 110 configured to radiate a radio wave toward a top face, a dielectric material 120 disposed on the bottom face of the radiator 110, which is opposite the top face of the radiator 110, a feeding unit 130 disposed on a bottom face of the dielectric material 120 to supply an electric signal to the radiator 110 through the dielectric material 120, a support unit 140 disposed on the bottom face of the dielectric material 120 and including a metallic material, and a printed circuit board (PCB) 150 coupled to the feeding unit 130 and the support unit 140 to supply the electric signal to the feeding unit 130.

The feeding unit 130 and the support unit 140 may be coupled to the PCB 150 through various methods. According to an embodiment, the feeding unit 130 and the support unit 140 may be coupled to the PCB through a surface-mount technology (SMT) process.

According to an embodiment, the PCB 150 may have a conductive pattern formed thereon, and an electric signal supplied from a wireless communication chip (not illustrated) may be supplied to the feeding unit 130 through the conductive pattern. That is, according to an embodiment, a conductive pattern is disposed on one face of the PCB 150, and a first end of the feeding unit 130 may be electrically connected to the conductive pattern. A wireless communication chip is disposed on the other face of the PCB 150, and an electric signal supplied through the wireless communication chip may be supplied to the feeding unit 130 through the conductive pattern.

According to an embodiment, the feeding unit 130 and the support unit 140 may be disposed such that the bottom face of the dielectric material 120 and the top face of the PCB 150 are spaced apart from each other by a predetermined first length.

According to an embodiment, the feeding unit 130 and the support unit 140 may be formed in the same shape or may be formed in different shapes. Even if the feeding unit 130 and the support unit 140 are different in shape from each other, in order to maintain parallelism between the radiator 110 and the PCB 150, the heights of the feeding unit 130 and the support unit 140 may be the same.

According to an embodiment, the frequency characteristic of a radio wave radiated through the radiator 110 may be determined on the basis of the first length (that is, the distance between the bottom face of the dielectric material 120 and the top face of the PCB 150). For example, the gain value of the radio wave radiated through the radiator 110 may be changed depending on the first length.

According to an embodiment, a distance may be formed between the radiator 110 and the feeding unit 130 by a second length through the dielectric material 120. That is, the feeding unit 130 and the radiator 110 may have a gap-coupled structure. The feeding unit 130 and the radiator 110 are both made of a metallic material, the feeding unit 130 and the radiator 110 are spaced apart from each other by the second length, and the dielectric material 120 is disposed in the space between the feeding unit 130 and the radiator 110. Therefore, with the above-described structure, it is possible to obtain an effect of disposing a capacitor or an inductor between the feeding unit 130 and the radiator 110, which makes it possible to improve the bandwidth of the radio wave radiated through the radiator 110.

Figure 2:
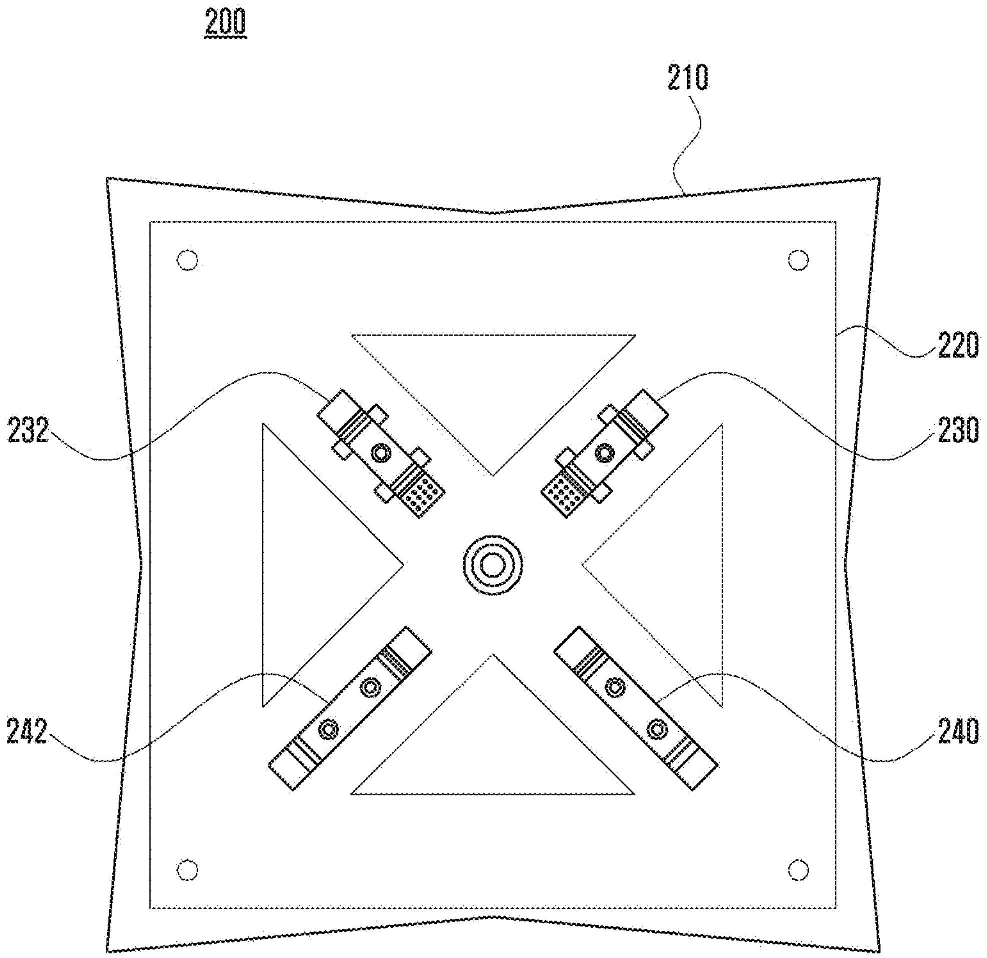
FIG. 2 is a bottom view of a configuration of the antenna module according to the first embodiment of the disclosure.

FIG. 2 is a bottom view of a configuration of an antenna module according to the first embodiment of the disclosure.

Referring to FIG. 2, FIG. 2 is a view for describing the configurations of a first feeding unit 230, a second feeding unit 232, a first support unit 242, and a second support unit 240 disposed on the bottom face of a dielectric material 220 in the configuration of an antenna module 200 according to the disclosure.

According to an embodiment, the feeding units may include the first feeding unit 230 configured to supply an electric signal related to horizontal polarization to a radiator 210 disposed on the top face of the dielectric material 220, and the second feeding unit 232 configured to supply an electric signal related to vertical polarization to the radiator 210.

According to an embodiment, on the bottom face of the dielectric material 220, an extension line of the first feeding unit 230 and an extension line of the second feeding unit 232 may be perpendicular to each other. The extension line of the first feeding unit 230 and the extension line of the second feeding unit 232 may be perpendicular to each other to improve the isolation between the horizontal polarization and the vertical polarization.

According to an embodiment, on the bottom face of the dielectric material 220, the first support unit 242 disposed on the extension line of the first feeding unit 230 and the second support unit 240 disposed on the extension line of the second feeding unit 232 may be included.

According to an embodiment, the first support unit 242 and the second support unit 240 may include a metallic material. The distribution of an electromagnetic field generated by the electric signals flowing through the first feeding unit 230 or the second feeding unit 232 may be changed through the first support unit 242 and the second support unit 240. That is, the isolation performance of the antenna module 200 according to the disclosure may be improved by the metallic material included in the first support unit 242 and the second support unit 240.

According to an embodiment, the degree of improvement of the isolation performance of the antenna module 200 may be determined depending on the size of the contact area between the first and second support units 242 and 240 and the bottom face of the dielectric material 220.

Meanwhile, in the disclosure, it is disclosed that the first feeding unit 230 may supply an electric signal related to the horizontal polarization and that the second feeding unit 232 may supply an electric signal related to the vertical polarization, but the scope of the disclosure should not be construed as being limited thereto. For example, the first feeding unit 230 may supply an electric signal related to the vertical polarization and the second feeding unit 232 may provide an electric signal related to the horizontal polarization.

Figure 3A:
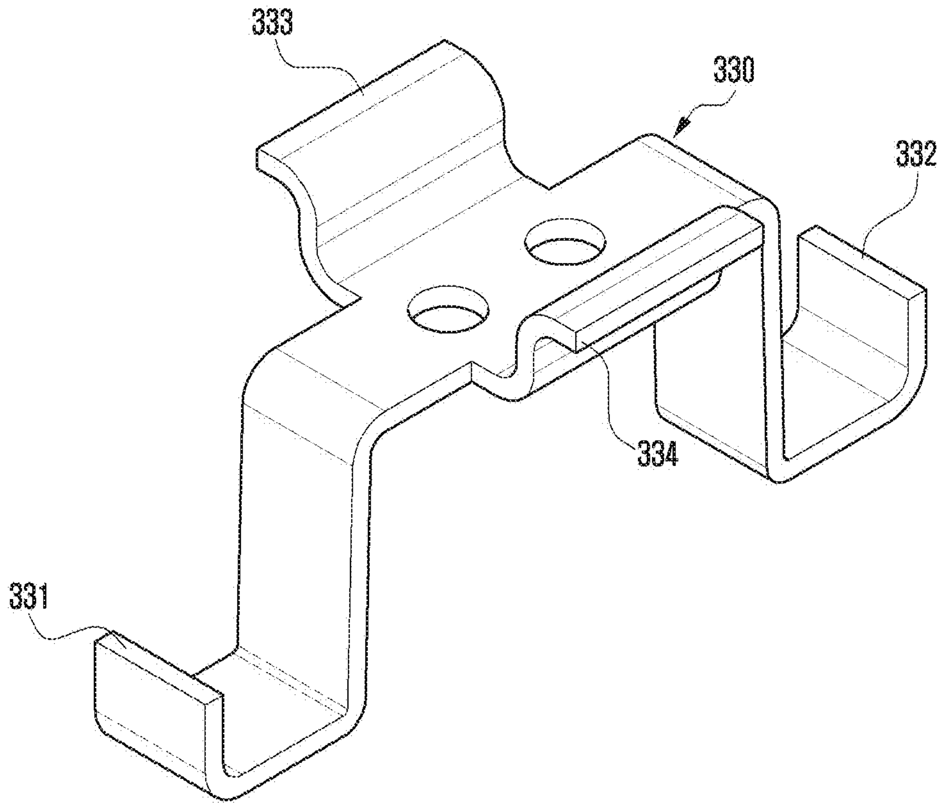
FIG. 3A is a view illustrating a feeding unit or a support unit according to the first embodiment of the disclosure.

FIG. 3A is a view illustrating a feeding unit or a support unit according to the first embodiment of the disclosure.

Referring to FIG. 3A, a feeding unit 330 according to the disclosure may include a first segment disposed on the bottom face of the dielectric material, a second segment extending from a first end of the first segment toward the PCB to be coupled to the top face of the PCB, and a third segment extending from a second end of the first segment toward the PCB to be coupled to the top face of the PCB.

According to an embodiment, the first segment is a portion that is directly coupled to the bottom face of the dielectric material, and the first segment may supply an electric signal to the radiator disposed on the top face of the dielectric material through the bottom face of the dielectric material. According to an embodiment, the isolation performance of the antenna module including the first segment may be improved depending on the area size of the first segment.

According to an embodiment, the second segment and the third segment may extend from the first end of the first segment such that the bottom face of the dielectric material and the top face of the PCB are spaced apart from each other by the predetermined first length. According to an embodiment, the frequency characteristic of a radio wave radiated through the radiator may be determined on the basis of the first length.

According to an embodiment, the feeding unit 330 may be formed by being welded to the dielectric material, and the first segment may include a plurality of protrusions such that the feeding unit 330 is not separated from the dielectric material during injection molding. According to an embodiment, the first segment may include a first protrusion 333 and a second protrusion 334 so as not to be separated from the dielectric material, the second segment may include a third protrusion 331 so as not to be separated from the dielectric material, and the third segment may include a fourth protrusion 332 so as not to be separated from the dielectric material.

Meanwhile, although FIG. 3A illustrates the case in which the feeding unit or the support unit includes the first segment, the second segment, and the third segment, this is merely an example and the scope of the disclosure is not limited thereto.

According to an embodiment, the feeding unit may include only a first segment disposed on the bottom face of the dielectric material and a second segment extending from the first end of the first segment toward the PCB and coupled to the top face of the PCB.

That is, the feeding unit may receive an electric signal for radiating a radio wave from the PCB through the second segment, the electric signal may be transmitted to the first segment through the second segment, and the electric signal may be supplied from the first segment to the radiator through the bottom face of the dielectric material.

According to an embodiment, the second segment may execute the function of supporting the dielectric material such that the distance between the dielectric material and the PCB is maintained, in addition to the function of transmitting an electric signal from the PCB.

Figure 3B:
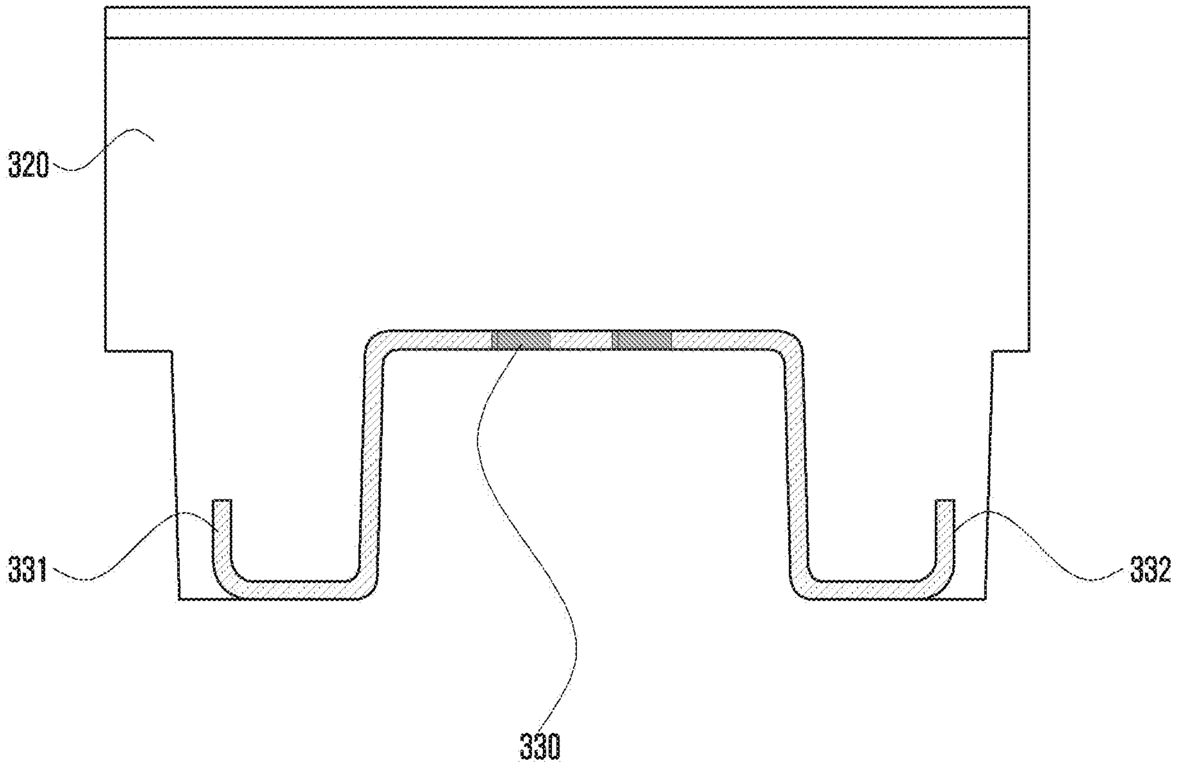
FIG. 3B is a view illustrating a feeding unit or a support unit connected to a dielectric material according to the first embodiment of the disclosure.

FIG. 3B is a view illustrating a feeding unit or a support unit connected to a dielectric material according to the first embodiment of the disclosure.

Figure 3C:
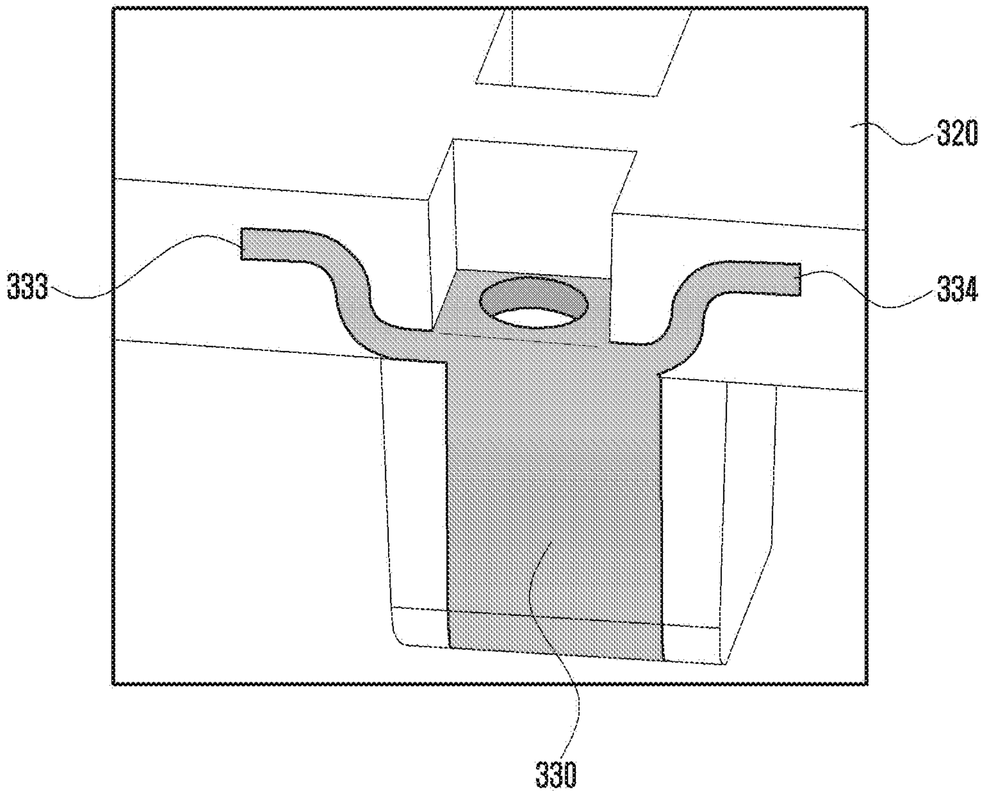
FIG. 3C is another view illustrating a feeding unit or a support unit connected to a dielectric material according to the first embodiment of the disclosure.

FIG. 3C is another view illustrating a feeding unit or a support unit connected to a dielectric material according to the first embodiment of the disclosure.

Referring to FIG. 3B, the third protrusion 331 and the fourth protrusion 332 disposed on the feeding unit 330 are connected to a dielectric material 320 and are able to prevent the feeding unit 330 from being separated in the horizontal direction.

Referring to FIG. 3C, the first protrusion 333 and the second protrusion 334 disposed on the feeding unit 330 are connected to the dielectric material 320 and are able to prevent the feeding unit 330 from being separated in the vertical direction.

Meanwhile, although FIGS. 3A to 3C illustrate only the shape of the feeding unit according to various embodiments of the disclosure, the support unit according to the disclosure may have a shape that is the same as or similar to that of the feeding unit. In addition, since the shape of the feeding unit disclosed in the disclosure is merely an embodiment, the scope of right of the disclosure should not be construed as being limited to the shape of the feeding unit or the support unit illustrated in FIGS. 3A to 3C.

Second Embodiment

Figure 4:
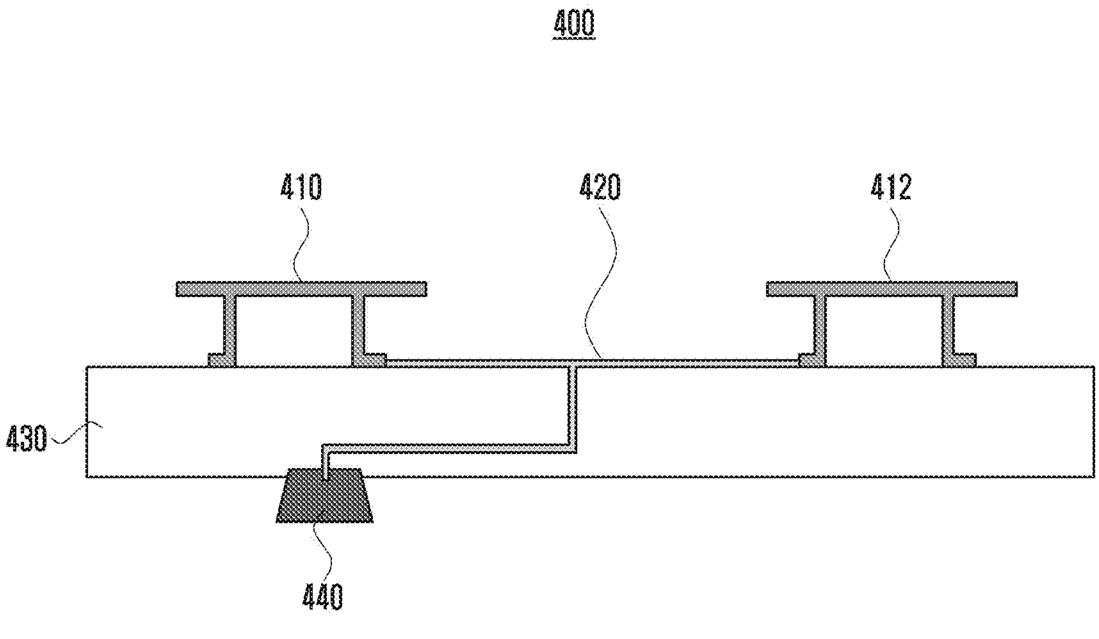
FIG. 4 is a view illustrating an antenna module including a metal structure according to a second embodiment of the disclosure.

FIG. 4 is a view illustrating an antenna module including a metal structure according to a second embodiment of the disclosure.

Referring to FIG. 4, an antenna module 400 according to the disclosure may include an insulator 430 having a plate shape and including a conductive pattern 420 formed thereon to allow an electric signal to flow therethrough, metal structures 410 and 412 disposed on the top face of the insulator 430 and configured to radiate a radio wave through a top face spaced apart from the insulator 430 by a predetermined first length, and a wireless communication chip 440 disposed on the bottom face of the insulator 430 to supply an electric signal for radiating a radio wave to the metal structures 410 and 412 through the conductive pattern 420.

According to an embodiment, the wireless communication chip 440 may directly supply an electric signal to the metal structures 410 and 412 through the conductive pattern 420. That is, while the configuration of the antenna module according to the first embodiment is a configuration in which the feeding unit and the radiator are spaced apart from each other by a predetermined distance through the dielectric material (that is, a structure configured to indirectly supply an electric signal to the radiator), the configuration of the antenna module 400 disclosed in the second embodiment is a configuration in which the metal structures 410 and 412 are supplied with an electric signal directly from the wireless communication chip 440 through the conductive pattern 420.

In other words, the metal structures 410 and 412 according to the second embodiment include all of the feeding unit, the support unit, and the radiator of the antenna module disclosed in the first embodiment. The specific configurations of the metal structures 410 and 412 will be described later with reference to FIG. 5.

Figure 5:
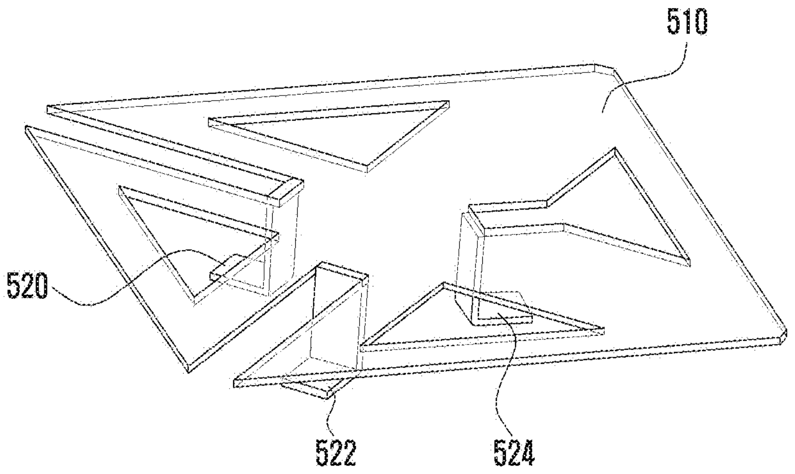
FIG. 5 is a view illustrating a metal structure according to the second embodiment of the disclosure.

FIG. 5 is a view illustrating a metal structure according to the second embodiment of the disclosure.

Referring to FIG. 5, the metal structure according to the second embodiment may include a first feeding unit 520 having a first end electrically connected to a conductive pattern formed on the insulator and a second end electrically connected to a top face 510 of the metal structure, the first feeding unit 520 being disposed such that the top face 510 of the metal structure is spaced apart from the top face of the insulator by the first length, a second feeding unit 522 having a first end electrically connected to the conductive pattern formed on the insulator and a second end electrically connected to the top face 510 of the metal structure, the second feeding unit 522 being disposed such that the top face 510 of the metal structure is spaced apart from the top face of the insulator by the first length, and a support unit 524 having a first end connected to the top face of the insulator and a second end connected to the top face 510 of the metal structure, the support unit 524 being disposed such that the top face 510 of the metal structure is spaced apart from the top face of the insulator by the first length.

According to an embodiment, the first feeding unit 520 may supply an electric signal related to horizontal polarization to the top face 510 of the metal structure, and the second feeding unit 522 may supply an electric signal related to vertical polarization to the top face 510 of the metal structure. According to an embodiment, the top face 510 of the metal structure may receive electric signals from the first feeding unit 520 or the second feeding unit 522 to radiate radio waves. That is, the top face 510 of the metal structure may execute an operation, which is the same as or similar to that of the radiator.

According to an embodiment, on the top face of the insulator, an extension line of the first feeding unit 520 and an extension line of the second feeding unit 522 may be perpendicular to each other. According to an embodiment, it is possible to improve the isolation performance of the antenna module by disposing the extension line of the first feeding unit 520 and the extension line of the second feeding unit 522 to be perpendicular to each other.

According to an embodiment, the support unit 524 may be disposed in a region between the extension line of the first feeding unit 520 and the extension line of the second feeding unit 522. That is, the extension line of the first feeding unit 520 and the extension line of the second feeding unit 522 may be perpendicular (90°) to each other when viewed from the top face 510 of the metal structure, and the support unit 524 may be disposed at a point of 135° in a 270° angular range formed on the top face 510 of the metal structure by the first feeding unit 520 and the second feeding unit 522.

According to an embodiment, it may be most advantageous in terms of isolation performance of the antenna module that the extension line of the first feeding unit 520 and the extension line of the second feeding unit 522 be perpendicular to each other and that the support unit 524 be disposed in the region between the extension line of the first feeding unit 520 and the extension line of the second feeding unit 522.

Meanwhile, in the disclosure, it is disclosed that the first feeding unit 520 may supply an electric signal related to the horizontal polarization and that the second feeding unit 522 may supply an electric signal related to the vertical polarization, but the scope of the disclosure should not be construed as being limited thereto. For example, the first feeding unit 520 may supply an electric signal related to the vertical polarization and the second feeding unit 522 may provide an electric signal related to the horizontal polarization.

In addition, since the metal structure illustrated in FIG. 5 is merely an embodiment of the metal structure disclosed in the disclosure, the scope of the disclosure should not be construed as being limited to the metal structure illustrated in FIG. 5.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna module for a wireless communication apparatus configured to communicate with a terminal, the antenna module comprising:

a plate comprising a conductive pattern;

a plurality of metal structures, wherein each metal structure of the plurality of metal structures comprises a top face portion, a first feeding portion, and a second feeding portion, and is configured to radiate signals through the top face portion of the metal structure; and a plurality of communication chips, each communication chip of the plurality of communication chips electrically connected to the conductive pattern to supply electric signals to at least two metal structures of the plurality of metal structures, wherein the first feeding portion and the second feeding portion of each metal structure of the metal structures are disposed to support the top face portion to be spaced apart from the plate.

2. The antenna module of claim 1, wherein a first communication chip of the plurality of communication chips is connected to a first part of the conductive pattern to supply the electric signals to a first metal structure and a second metal structure of the plurality of metal structures, and wherein a second communication chip of the plurality of communication chips is connected to a second part of the conductive pattern to supply the electric signals to the first metal structure and the second metal structure of the plurality of metal structures.

3. The antenna module of claim 1,
wherein each metal structure of the plurality of metal structures is configured to radiate a first signal corresponding to the first feeding portion and a second signal corresponding to the second feeding portion,
wherein a first polarization of the first signal and a second polarization of the second signal are different, and
wherein the first polarization of the first signal and the second polarization of the second signal are substantially perpendicular.

4. The antenna module of claim 3,
wherein, for each metal structure of the plurality of metal structures,
the first feeding portion is disposed to supply the first signal to the top face portion according to the first polarization, and
the second feeding portion is disposed to supply the second signal to the top face portion according to the second polarization.

5. The antenna module of claim 1,
wherein the first feeding portion is formed to maintain a predetermined distance from the plate to the top face portion, and
wherein the second feeding portion is formed to maintain the predetermined distance from the plate to the top face portion.

6. The antenna module of claim 1, wherein the first feeding portion and the second feeding portion are disposed to be physically connected to an inner area of the top face portion of the metal structure.

7. The antenna module of claim 1, wherein each metal structure of the plurality of metal structures comprises a first opening and a second opening.

8. The antenna module of claim 1,
wherein each metal structure of the plurality of metal structures is disposed on a first side of the plate,
wherein each communication chip of the plurality of communication chips is disposed on a second side opposite to the first side of the plate, and
wherein the conductive pattern to provide electric signals to at least two metal structures of the plurality of metal structures is formed on the first side of the plate.

9. The antenna module of claim 1, wherein the first feeding portion and the second feeding portion are formed such that an extension line for the first feeding portion and an extension line for the second feeding portion are substantially perpendicular on the plate.

10. The antenna module of claim 1, wherein the top face portion of the metal structure has substantially a quadrilateral shape.

11. A communication apparatus configured to communicate with a terminal, the communication apparatus comprising:
a plate comprising a conductive pattern;
a plurality of metal structures, wherein each metal structure of the plurality of metal structures comprises a top face portion, a first feeding portion, and a second feeding portion, and is configured to radiate signals through the top face portion of the metal structure; and
a plurality of communication chips, each communication chip of the plurality of communication chips electrically connected to the conductive pattern to supply electric signals to at least two metal structures of the plurality of metal structures,
wherein the first feeding portion and the second feeding portion of each metal structure of the metal structures are disposed to support the top face portion to be spaced apart from the plate.

12. The communication apparatus of claim 11,
wherein a first communication chip of the plurality of communication chips is connected to a first part of the conductive pattern to supply the electric signals to a first metal structure and a second metal structure of the plurality of metal structures, and
wherein a second communication chip of the plurality of communication chips is connected to a second part of the conductive pattern to supply the electric signals to the first metal structure and the second metal structure of the plurality of metal structures.

13. The communication apparatus of claim 11,
wherein each metal structure of the plurality of metal structures is configured to radiate a first signal corresponding to the first feeding portion and a second signal corresponding to the second feeding portion,
wherein a first polarization of the first signal and a second polarization of the second signal are different, and
wherein the first polarization of the first signal and the second polarization of the second signal are substantially perpendicular.

14. The communication apparatus of claim 13,
wherein, for each metal structure of the plurality of metal structures,
the first feeding portion is disposed to supply the first signal to the top face portion according to the first polarization, and
the second feeding portion is disposed to supply the second signal to the top face portion according to the second polarization.

15. The communication apparatus of claim 11,
wherein the first feeding portion is formed to maintain a predetermined distance from the plate to the top face portion, and
wherein the second feeding portion is formed to maintain the predetermined distance from the plate to the top face portion.

16. The communication apparatus of claim 11, wherein the first feeding portion and the second feeding portion are disposed to be physically connected to an inner area of the top face portion of the metal structure.

17. The communication apparatus of claim 13,
wherein each metal structure of the plurality of metal structures comprises a first opening for the first polarization and a second opening for the second polarization,
wherein the first opening is connected to the first feeding portion, and
wherein the second opening is connected to the second feeding portion.

18. The communication apparatus of claim 11,
wherein each metal structure of the plurality of metal structures is disposed on a first side of the plate,
wherein each communication chip of the plurality of communication chips is disposed on a second side opposite to the first side of the plate, and
wherein the conductive pattern to provide electric signals to at least two metal structures of the plurality of metal structures is formed on the first side of the plate.

19. The communication apparatus of claim 11, wherein the first feeding portion and the second feeding portion are formed such that an extension line for the first feeding portion and an extension line for the second feeding portion are substantially perpendicular on the plate.

20. The communication apparatus of claim 11, wherein the top face portion of the metal structure has substantially a quadrilateral shape.

* * * * *